C. L. DEPOLLIER.
SECURING DEVICE FOR EXPANSIBLE BRACELETS.
APPLICATION FILED MAR. 14, 1913.
1,158,900. Patented Nov. 2, 1915.
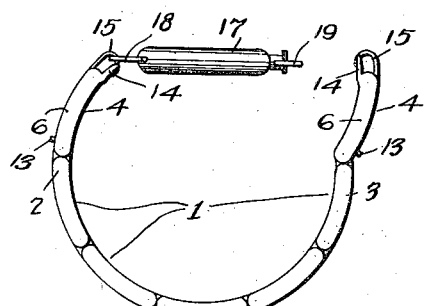
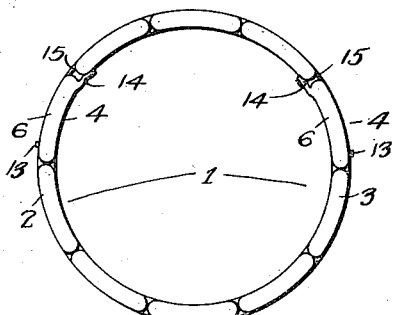
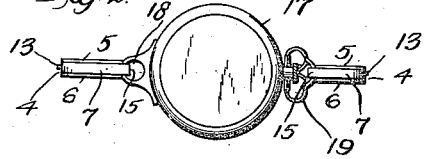
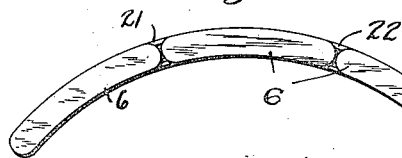
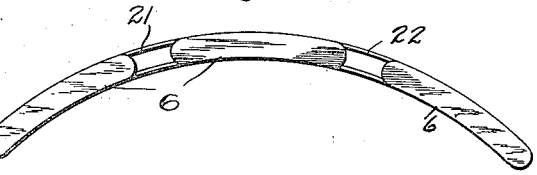
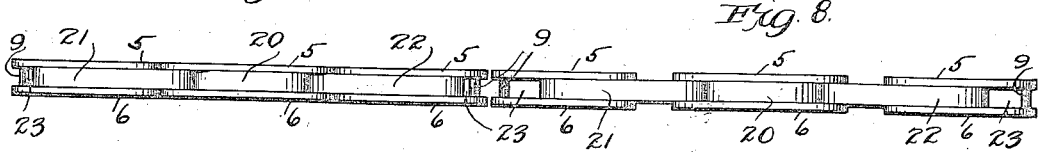
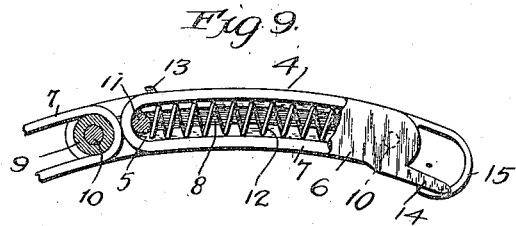
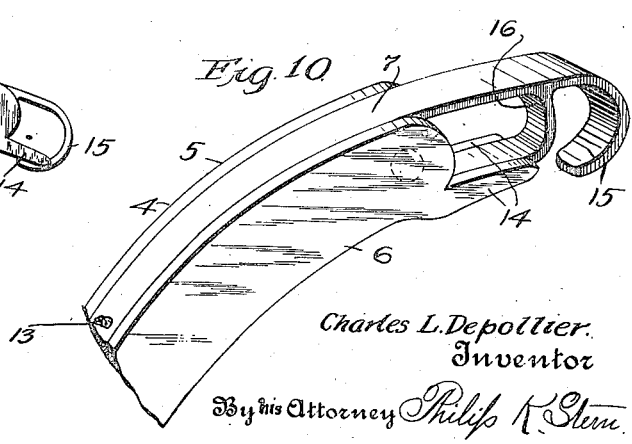
Witnesses:
Charles L. Depollier,
Inventor
By his Attorney Philip K. Stern

UNITED STATES PATENT OFFICE.

CHARLES L. DEPOLLIER, OF NEW YORK, N. Y.

SECURING DEVICE FOR EXPANSIBLE BRACELETS.

1,158,900.  Specification of Letters Patent.  Patented Nov. 2, 1915.

Application filed March 14, 1913. Serial No. 754,326.

*To all whom it may concern:*

Be it known that I, CHARLES L. DEPOLLIER, a citizen of the United States, residing in the city of New York, county of Kings, and State of New York, have invented certain new and useful Improvements in Securing Devices for Expansible Bracelets, of which the following is a specification.

My invention relates to a catch hook for expansible bracelets adapted to connect a plurality of links and housed springs in a manner to form a structure which may expand and contract within the limits of the longitudinal movement of the springs and links.

The object of my invention is to couple a bracelet structure by a novel construction of catch hook actuated by the spring mechanism of the terminal links of the said structure.

Another object of this invention is to devise a reliable link catch hook connection and guard therefor, whereby the component parts may be assembled with security, linked and uncoupled with the greatest facility, as well as to provide neatness and simplicity in structure.

The foregoing and such other objects as may occur from the ensuing description are attained by the construction, combination and arrangement of parts such as illustrated by the accompanying drawings, more fully described hereinafter, and particularly pointed out in the claims appended hereto.

With reference to the drawings: Figure 1 is a side elevational view, of an expansible bracelet, embodying my invention, and illustrating, the introduction thereto, of a watch-case, and the bracelet in an open or uncoupled condition. Fig. 2 is a front elevational view of the bracelet, after the same has been closed by coupling the catch-hook thereof with the free loop or bow of the watch-case. Fig. 3 is a side elevational view of the bracelet illustrated in Fig. 2, illustrating its condition when a plurality of my improved expansible link units are introduced in lieu of the watch-case; in this view, it will be observed that the bracelet appears in a closed or hooked condition. Fig. 4 is a front elevational view thereof. Fig. 5 is a somewhat enlarged, side elevational view of a unit link structure, in a contracted condition, and Fig. 6 is a similar view, illustrating the link structure extended. Fig. 7 is a front elevational view of the bracelet when in the condition as illustrated in Fig. 5, and Fig. 8, a like view thereof, when in the condition as illustrated in Fig. 6. Fig. 9 is an enlarged fragmentary side elevational view, of one of my improved spring catch-hooks, combined with a terminal link structure; the latter having a portion of the side thereof broken away, together with a fragmentary section of an adjoining link, and Fig. 10 is an enlarged detailed view of my improved catch-hook and guard taken in perspective and a fragment of the link terminal carrying the same.

In the several figures, similar characters of reference are employed to designate like or the same parts throughout where they occur, wherein, 1 refers to the base of the bracelet structure, which is composed of a plurality of spring retracted link units of well known construction, in the present instance, forming no part of my invention.

To each of the terminals 2 and 3 of the bracelet structure 1, is pivotally secured one of my improved spring retracted catch-hook links 4. This comprises a pair of lateral curvilinear link plates 5 and 6 and a correspondingly formed and intermediately situated and slidingly engaging open link loop 7. The lateral link plates 5 and 6 are provided with longitudinal intermediately situated grooves or tracks 8 on their inner faces. These have a cross-section of rectangular form and extend along the link plates 5 and 6 substantially equal to the longitudinal range of expansion together with the spring displacement, as will be more fully hereinafter described.

The side link plates 5 and 6 are laterally spaced to accommodate, and slidingly fit and support the open link loop 7 by cylindrical terminal collets 9, and are secured together by through rivets 10.

Within the open link loop 7 and secured to the inner end wall thereof and at the end adjacent to a neighboring open link loop 7, is a cross head pin or guide 11. This has its ends projecting laterally, to slidingly fit the tracks 8 of the link plates 5 and 6, and provide at one end of the open link 7, a longitudinal guiding pin, while the other terminal of the said open link is guided by a collet 9.

Interposed between the collet 9 and guide pin 11 is a spiral compression spring 12, the office of which is to carry the open link loop 7 toward an adjacent similar link of the link structure.

Projecting from the outer surface of the terminal link loop 7 and adjacent to a neighboring link loop is an integral barb 13. This provides a finger catch, whereby the open link loop 7 may be driven against the tension of the spring 12 away from the neighboring open link 7. Integral with and extending from each of the side plates 5 and 6, are terminal projecting lugs or guards 14 and integrally formed from the outer wall of the open link loop 7 is a hook 15. This latter is adapted to play between the lugs or guards 14 slidingly as the open link loop 7 is slid longitudinally by the reaction of the spring 12. When the open link 7 however, is moved against the thrust of the spring 12 to the limit of its outward movement, a gap will be formed between the free ends of the guard 14 and the end of the hook 15, thus presenting a passage or mouth between these two members for the connection and disconnection of additional link units or the substitute watch-case, referred to in Figs. 1 and 2.

In practice, I prefer to form the open link loop 7 of a strip of folded metal, having one of its terminals bent to form the hook 15, and the other terminal bent to abut with and fit against the inner wall of the strip adjacent to the hook 15 after the said strip has been folded or otherwise formed to provide the open link formation and then make the said link integral by soldering the abutting end to the inner or adjacent surface of the open link 7 in a manner whereby a fillet 16 will be formed at the junction.

In the instance illustrated, in Figs. 1 and 2, the terminal catch-hooks 15 do not permit of being interlocked with each other to affect the closing of the bracelet without the introduction of an additional element, which, in this instance, is a watch-case 17. This is provided with a laterally extending eye 18 and a ring or bow 19 which respectively engage the oppositely situated catch-hook 15.

When it is desired to vary the design from the watch-case feature to that of a uniform bracelet of ring formation, I provide a bracelet section built up of three link units, comprising a non-elastic intermediate link structure 20 and two pivotally connected terminal spring retracted link structures 21 and 22, provided with coupling pins 9, previously referred to as collets, and side link plates 5 and 6, having opposing tracks 8, open link loops 7, through rivets 10, guide pins 11, and compression springs 12 respectively as shown in Fig. 9. The opposite free terminals of the side link plates 5 and 6 however, are provided with a clearance space 23, sufficient to accommodate the hook 15 at each end of the bracelet structure, which, in Fig. 8 appears somewhat elongated, owing to the extended position of the triple link unit, as depicted in this view, while in Fig. 7, the said clearance space 23 is reduced to a minimum by virtue of the contracted condition of the structure.

In removing the watch-case 17 and introducing in lieu thereof the triple link unit comprising the members 20, 21 and 22, the catch-hooks 15 are snapped over the free collets 9 of the link structures 21 and 22 when the bracelet structure will assume the condition of that illustrated in Figs. 3 and 4 when a transformation in the ornamental feature of the bracelet shall have been effected, as well as an alteration in size, since additional peripheral length has been given it thereby, and as will be observed, the inner periphery has been increased.

It is obvious that the enlargement may be augmented by the introduction of a number of the link units, and thus not only a variety in form but changes in the size of the bracelet may be affected by my improvements. Moreover with respect to the catch-hook 15, it will be observed that it is so positioned, to present an opening between the end of the guards 14 which is directed toward the inner periphery of the bracelet and the wrist of the wearer. The purpose of this positioning of the catch-hook 15 and guards 14 is to present an obstruction against the accidental uncoupling of a connected member, as afforded by the engagement of the inner periphery of the bracelet structure with the wrist of the wearer, thus an important feature of my invention is secured. The introduction of the guard 14, forming a component part of the catch-hook structure promotes durability at the coupling junction, inasmuch as that it supports the end of the catch-hook 15 against lateral dislodgement, and in addition, provides a foundation for the engaging terminal of a linked element. Hence it will be understood that my improved expansible bracelet provides facilities whereby the ornamental features of the bracelet, as well as the size thereof, may be varied, and further, that it provides a reliable and simple link connection or coupling between the several units of a bracelet or similar structure, and—

Having fully described my invention, I claim as new and desire to secure by Letters Patent of the U. S.

In an expansible link device for securing an article to each end of a bracelet, comprising a link structure composed of two interlinked members slidable in relation to each other, one member consisting of two opposite laterally spaced link plates, each plate being provided with a terminal projecting integral guard, and the other member consisting of an open link having a terminal projecting hook portion at its outer end, said hook portion engaging with the ends of the said guards and overlapping the same to form a closed loop when the structure is in its closed position.

In testimony whereof, I have signed my name to this specification in the presence of two subscribing witnesses.

CHARLES L. DEPOLLIER.

Witnesses:
HENRY GINNEL,
W. F. LENCHTMANN.